United States Patent [19]

Carriera

[11] 4,047,440

[45] Sept. 13, 1977

[54] STARTER FOR ROPE PULL OUTBOARD MOTORS

[76] Inventor: Manuel Carriera, 560 Ramos Ave., No. 1, Hayward, Calif. 94544

[21] Appl. No.: 707,676

[22] Filed: July 22, 1976

[51] Int. Cl.[2] .......................... F02N 5/02; F03G 1/00

[52] U.S. Cl. .............................................. 74/6; 74/2; 74/520; 123/179 S; 123/179 SE; 123/185 BB; 123/185 C; 185/39

[58] Field of Search ......... 123/179 S, 179 SE, 185 R, 123/185 A, 185 B, 185 BB, 185 C, 185 CA; 74/2, 6, 520; 185/9, 10, 37, 39; 124/26, 27

[56] References Cited

U.S. PATENT DOCUMENTS

| | | | |
|---|---|---|---|
| 2,850,003 | 9/1958 | Konle | 123/185 BB |
| 3,028,851 | 4/1962 | Drake | 124/27 X |
| 3,174,471 | 3/1965 | Weglage et al. | 123/185 C |
| 3,337,104 | 8/1967 | Wilson | 74/2 X |
| 3,718,129 | 2/1973 | McKee | 123/185 R X |

*Primary Examiner*—Allan D. Herrmann
*Attorney, Agent, or Firm*—William R. Piper

[57] ABSTRACT

A starter for a rope pull outboard motor that may be quickly and readily attached to the top of the motor housing. The device includes an outboard motor rope pulling member that can be spring-loaded by a manually operable means after which the handle of the outboard motor rope may be connected to the rope pulling member. Növel guiding means is used for the rapid movement of the rope pulling member to quickly pull the rope to start the motor when the spring biased rope pulling member is freed. A shock absorber brings the rope pulling member to a resilient stop at the end of the movement of the member.

4 Claims, 4 Drawing Figures

STARTER FOR ROPE PULL OUTBOARD MOTORS

SUMMARY OF THE INVENTION

An object of my invention is to provide a starter for a rope pull outboard motor which makes use of a toggle principle to tension a plurality of coil springs to spring-load a rope pulling member and hold it in a tensioned state while connecting the handle of the pull rope to the member after which the member may be freed to permit the springs to rapidly move the rope pulling member for starting the motor.

A further object of my invention is to provide a device of the type described that may be readily attached to a standard outboard motor. The device is simple to operate.

DESCRIPTION OF THE PREFERRED EMBODIMENT

Figure 1:
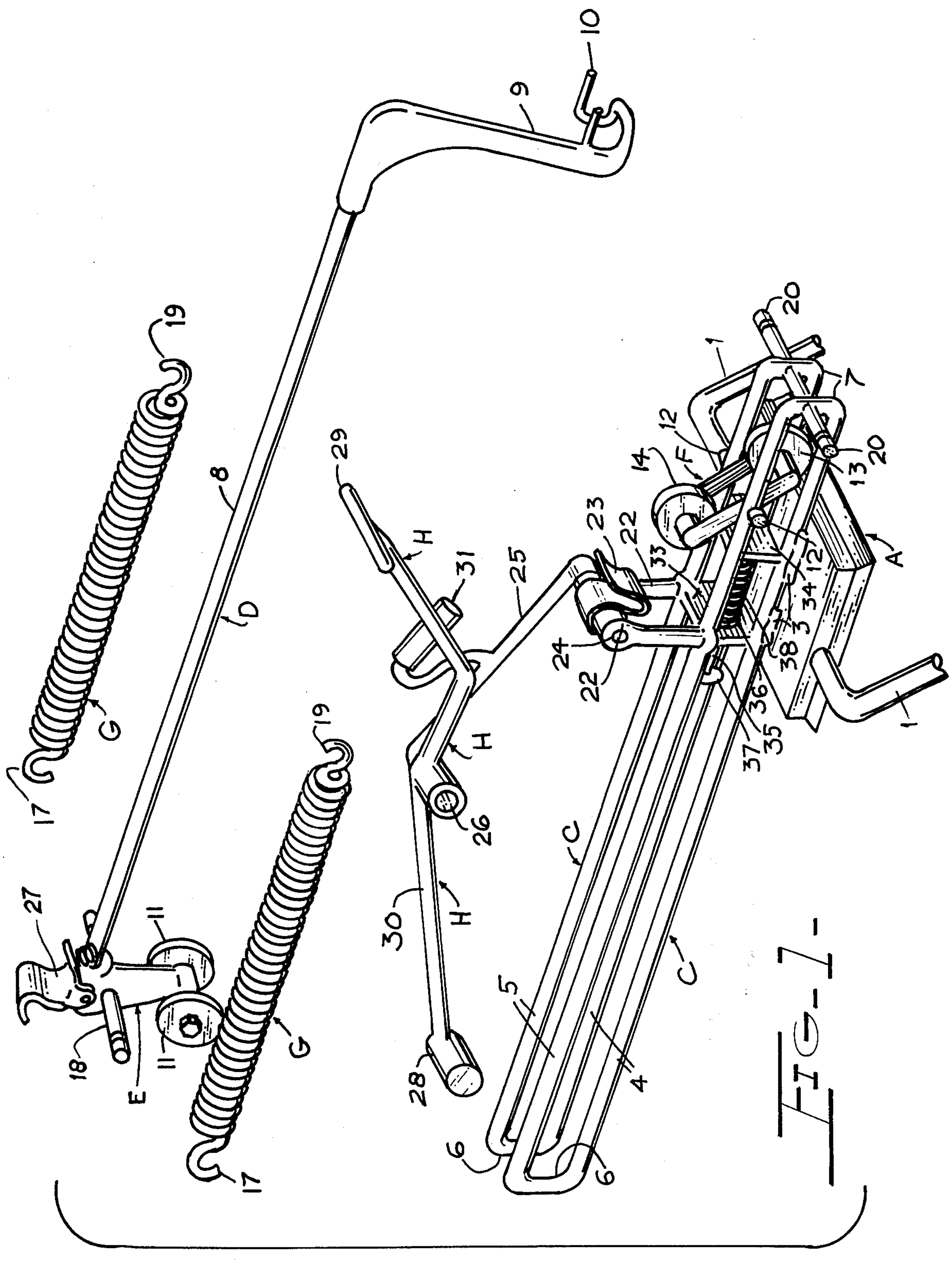
FIG. 1 is an isometric exploded view of the device.
Figure 2:
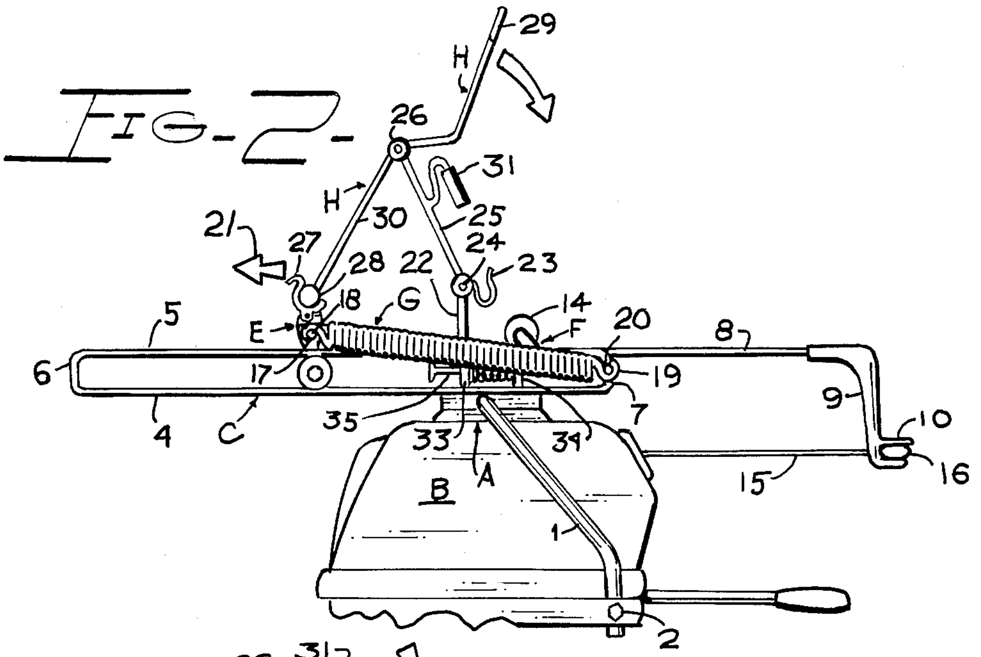
FIG. 2 is a side elevation of the device on a smaller scale and shown attached to a standard outboard motor. The device is shown in the process of being spring-loaded.
Figure 3:
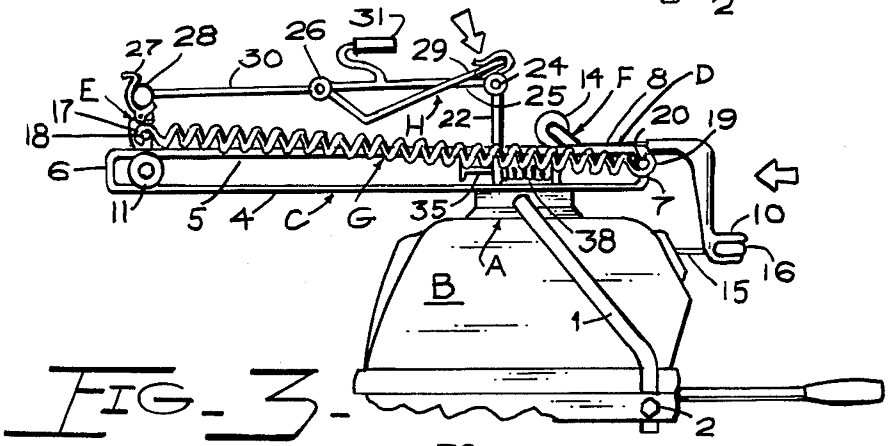
FIG. 3 is a side elevation similar to FIG. 2 except that the device has completed its spring-loading operation and the handle of the pull rope for starting the outboard motor has been connected to the rope pulling member of the outboard motor.
Figure 4:
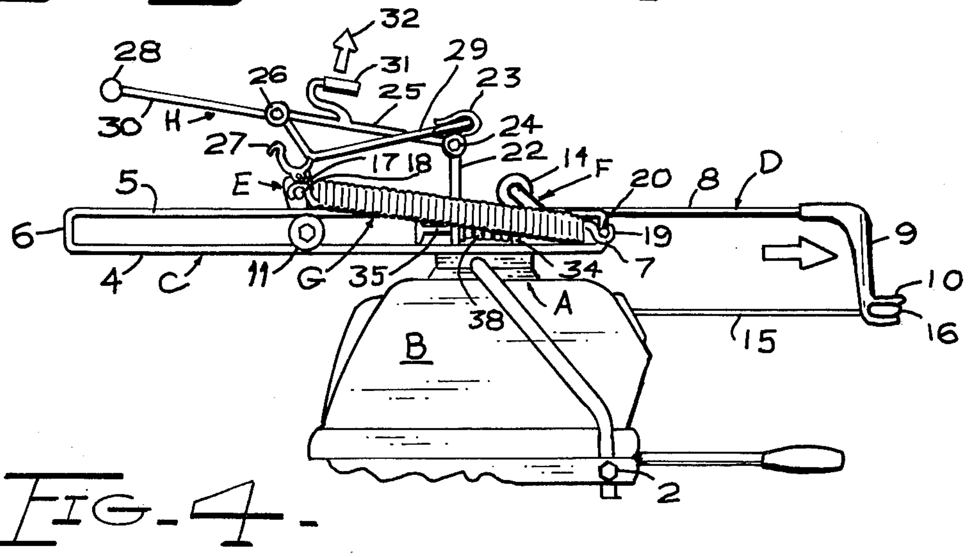
FIG. 4 is a side elevation similar to FIGS. 2 and 3 and shows the parts in released position and the spring actuated rope pulling member quickly pulling on the rope for starting the outboard motor.

In carrying out my invention I provide a metal base A for the device and this base is positioned on the cowling of an outboard motor B, indicated generally in FIGS. 2, 3 and 4. Any desired means may be used for securing the base to the motor and I have shown arms 1—1, see FIG. 1, extending from the sides of the base and having their free ends anchored to the motor at 2.

A pair of parallel guide tracks C—C, see FIG. 1, are attached to the base A, by welding 3 or any suitable fastening means. The two guide tracks are identical to each other and each is formed from a rod into the shape of an elongated rectangle with a lower rail 4 being spaced from and extending parallel to an upper rail 5, the two rails being interconnected at their ends by integral end portions 6 and 7. The planes of the rectangular-shaped guide tracks C—C extend at right angles to the plane of the base A and the two planes of the tracks parallel each other and are spaced apart which is clearly shown in FIG. 1.

I provide an elongated rope pulling member and shown in isometric at D, in FIG. 1. This member includes a rod 8 with a downwardly extending arm 9 provided with a clevis 10 at its end. A trolley E supports the rear end of the rod 8 and it has a pair of trolley wheels 11—11. FIGS. 2 to 4 inclusive illustrate the trolley wheels travelling along the parallel guide tracks C. The wheels ride along the lower rails 4—4 and are held from jumping the rails by the upper rails 5—5.

Again referring to FIG. 1, it will be seen that between the parallel guide tracks C—C that control the movement of the trolley wheels 11—11, I mount a roller guide F for supporting and guiding the forward portion of the rod 8, see the isometric showing of the roller guide as being positioned near the forward ends of the guide tracks. The roller guide F comprises a frame pivotally mounted at its midpoint to the upper rails 5 at 12—12. Each end of the pivotal frame carries rollers 13 and 14 for contacting with the under and upper portions of the rod 8. The rod 8 is movably received between the rollers and the roller guide F, is free to swing on its pivots 12—12 so that the rollers 13 and 14 will support and guide the rod 8 in its movement.

The standard outboard motor B, is provided with pull rope 15 and handle 16 for starting the motor by quickly pulling on the rope. This requires considerable strength as well as quickness to pull the rope fast enough to start the engine. My device is designed to perform this operation. I will now describe the mechanism for spring-loading the rope pulling member D and then for connecting the pull rope handle 16 to the clevis 10 on the arm 9 so that upon the freeing of the member D, the tensioned springs will rapidly move the member D, and the pull rope 15 for starting the outboard motor B.

In FIG. 1, I show two coiled tension springs G—G. The ends 17 of the springs are attached to extensions 18 that project laterally from opposite sides of the trolley E. The forward ends 19 of the tension springs G, are connected to the ends of a laterally extending bar 20 which in turn is secured to the forward end portions 7—7 of the parallel guide tracks C—C. It will be seen that when the rod 8 and carriage E of the rope pulling member D, are moved rearwardly as indicated by the arrow 21 in FIG. 2, the springs G will be tensioned.

The novel means for tensioning the springs G, and for holding the rope pulling member D, in a spring-loaded state ready to be released for pulling the rope 15 and starting the outboard motor B, will now be described. FIG. 1 shows a pair of uprights 22—22 extending upwardly from the top rails 5—5 of the parallel guide tracks C—C. A spring clip 23 is swingably mounted on a pin 24 which is supported between the uprights 22—22 and a link 25 is also pivotally connected to the pin. An angularly shaped lever H, is pivotally connected substantially at its midpoint to the free end 26 of the link 25. The trolley E has a saddle 27 fixed to the top of the trolley and adapted to receive a cylindrical member 28 which is integral with one end of the lever H, see FIGS. 2 and 3. The opposite end of the lever H, is formed into a handle 29.

In assembling the rope pulling member D, in the device, the rod 8 will extend between the guide and support rollers 13 and 14, and the carriage E will have its trolley wheels received between the lower and upper rails of the spaced apart parallel guide tracks C—C, see FIG. 2-2, inclusive. When tensioning the coil springs G—G, the cylindrical end 28 of the lever H, is placed in the saddle 27 on the trolley E, and this will cause the lever to extend in an upwardly inclined direction and will also cause the link 25 to extend upwardly from its lower pivot 24 and to pivotally join the lever H, at the pivot 26. The portion 30 of the lever lying between the pivot 26 and the cylindrical integral end 28 will coact with the link 25 to form a toggle mechanism, as clearly shown in FIG. 2.

The operator in order to tension the coil springs G, will pull downwardly on the handle 29 of the lever H, and this will cause the cylindrical end 28 of the lever which is seated in the saddle 27 to move the saddle and with it the trolley E, in the direction of the arrow 21 in FIG. 2. The saddle 27 is so shaped that the downward and rearward thrust of the cylindrical end 28 of the lever H, as the lever is swung from the position shown in FIG. 2 into that shown in FIG. 3, will maintain the cylindrical end 28 in the saddle 27 with no chance of it slipping accidentally out of the saddle. When the spring tensioning lever H, has been swung into "cocked" position as shown in FIG. 3, the swingable clip 23 will be manually swung for causing it to grip the lever handle 29 and prevent the lever from swinging upwardly. The clip 23 functions as a temporary anchoring means for the lever H.

It is important to note at this point that when the lever H and link 25 have been swung down into the spring tensioned "cocked" position shown in FIG. 3, and when the lever handle 29 is received in the spring clip 23, the toggle mechanism is fully expanded and the tensioned springs G will be exerting a pull on the lateral extensions 18. The shape of the saddle 27 is such as to translate this pull into a push on the cylindrical member 28 on the end of the lever H so as to tend to move the lever to the right in this Figure. The axis of the cylindrical member 28 is positioned at a point that lies in a horizontal plane which is below the axis of the pin 24. Therefore the push of the saddle 27 to the right in FIG. 3 on the cylindrical member 28 will tend to swing the lever H, in a counterclockwise direction about the pin 24 as a pivot. This of course is prevented because the carriage E will prevent any downward movement of the cylindrical member 28 and any resulting counterclockwise movement of the lever H. The result is that the lever H will remain in this "cocked" position until manually released.

When the parts of the toggle mechanism are in the "cocked" position shown in FIG. 3, the operator places the handle 16 of the pull rope 15 in the clevis 10 as clearly shown. The toggle mechanism is now ready to be released for starting the outboard motor B. All four FIGS. 1 to 4 inclusive, illustrate the link 25 as having an auxiliary handle 31 connected thereto. The operator pulls upwardly on the handle 31 to free the end 28 of the lever H from the saddle 27 and free the member D to start the motor and the arrow 32 in FIG. 4 indicates such movement. The link 25 forms one side of a triangle with the bent portion of the lever H lying between the pivot point 26 and the pivot point 24, the bent portion of the lever forming the remaining two sides of the triangle. Since the three sides of a triangle form a rigid structure, an upward pull on the handle 31 shown by the arrow 32 in FIG. 4, will not only swing the link 25 in a clockwise movement about the pivot 24, but the lever H will be given a similar clockwise swing since its handle 29 is gripped by the swingable clip 23 that rotates about the same pivot point 24. The result is that the entire length of the lever will be swung in a clockwise manner about the pivot point 24 and this will lift the cylindrical member 28 and free it from the saddle 27. Immediately, the trolley E will be freed and the tensioned springs G will exert a sufficient force to rapidly move the trolley E and the rope pulling member D to the right in FIG. 4 and pull the rope 15 to start the outboard motor.

I show a shock absorbing means for stopping the travel of the trolley E, in all four Figures of the drawing. The enlarged isometric view of FIG. 1, illustrates two transversely extending guide plates 33 and 34 for a spring biased plunger 35. The two guide plates are spaced apart and extend between the two parallel guide tracks for the trolley. The plunger rod 35 is free to slide in aligned openings in the guide plates. A collar 36 is keyed to the plunger rod 35 and normally bears against the adjacent surface of the guide plate 33 when the trolley E, is not contacting the head 37 of the plunger rod. A coil shock-absorbing spring 38 is mounted on that portion of the plunger rod lying between the two guide plates 33 and 34. One end of the spring contacts the collar 36 and the other end contacts the guide plate 34.

When the trolley E, is at its fully spring-loaded position, shown in FIG. 3, the trolley moving springs G—G, are tensioned and when the operator pulls upwardly on the handle 31 to free the cylindrical end 28 of the lever H from the saddle 27 on the trolley, the latter will be swiftly moved to the right in FIGS. 3 and 4 to pull the rope 15 and start the engine. This swift movement of the trolley must be stopped at the end of its run and the spring buffered shock absorber 35 will bring the trolley to a quick stop when the trolley strikes the plunger head 37 and compresses the shock absorbing spring 38.

The drawings show the handle of the pull rope in the clevis 10 at all times. This can be done to do away with the necessity of connecting the pull rope handle to the clevis for each time the motor is started.

I claim:

1. A starter for a rope pull outboard motor comprising:

a. a pair of spaced apart and parallel guide tracks securable to an outboard motor equipped with a pull cord for starting the motor;
b. a rope pulling member including a trolley movable along said guide tracks, said member having means for gripping the motor pull cord;
c. spring means for moving said rope pulling member for actuating the pull cord for starting the motor;
d. a hand operated toggle mechanism for moving said member for tensioning said spring means and for holding said member in a tensioned condition; and
e. said toggle mechanism being manually freed from said trolley to permit said tensioned spring means to rapidly move said rope pulling member for starting the motor.

2. The combination as set forth in claim 1: and in which a. said toggle mechanism including a lever having one end removably received in a saddle carried by said trolley and its other end formed into a handle;
b. a link pivotally secured at one end to a median point on said lever and having its other end pivotally secured
c. whereby a swinging movement of said lever in one direction will spread said toggle mechanism to cock said trolley and rope pulling member and to tension said spring means;
d. temporary anchoring means for holding said toggle mechanism in cocked position; and
e. an auxiliary handle mounted on said link for manually lifting said link and toggle mechanism for removing the end of said lever from said saddle for freeing said rope pulling member to pull the motor rope.

3. The combination as set forth in claim 1: and in which a. said rope pulling member has a rod extending forwardly of said trolley with said means for gripping the motor pull cord being positioned at the front end of said rod; and
b. a roller support and guide for said rod.

4. The combination as set forth in claim 1: and in which a. a shock absorbing means is positioned at the forward ends of said parallel guide tracks for stopping the forward movement of said trolley at the end of its rope pulling movement for starting the motor.

* * * * *